United States Patent [19]

Schulz

[11] 3,708,508
[45] Jan. 2, 1973

[54] METHOD FOR THE PURIFICATION AND RECOVERY OF TRIBUTYL PHOSPHATE USED IN REPROCESSING NUCLEAR FUEL

[75] Inventor: Wallace W. Schulz, Richland, Wash.

[73] Assignee: The United States of America as represented by the United States Atomic Energy Commission

[22] Filed: April 9, 1971

[21] Appl. No.: 132,830

[52] U.S. Cl. ......................252/364, 210/37, 210/38, 252/301.1 W, 260/990, 423/7, 423/10, 423/22, 423/63, 423/70
[51] Int. Cl. ..............................B01f 1/00, C07f 9/08
[58] Field of Search ...252/364; 260/990; 210/37, 38; 23/338, 341; 423/22, 63, 70, 7, 10

[56] References Cited

UNITED STATES PATENTS

| | | | |
|---|---|---|---|
| 3,188,169 | 6/1965 | Kraus et al. | 23/338 |
| 2,897,046 | 7/1959 | Bohlmann | 23/341 |
| 2,936,318 | 5/1960 | Moore | 260/990 |
| 3,112,275 | 11/1963 | Pollock et al. | 23/341 X |

FOREIGN PATENTS OR APPLICATIONS

| | | | |
|---|---|---|---|
| 1,051,978 | 12/1966 | Great Britain | 252/364 |
| 932,126 | 7/1963 | Great Britain | 210/37 |

Primary Examiner—Richard D. Lovering
Attorney—Roland A. Anderson

[57] ABSTRACT

Tributyl phosphate solutions used in reprocessing nuclear fuel are purified and removed by passing them through a bed of particles of a macroreticular anion or cation exchange resin whereby the chemical and radiolytic degradation products and fission products present in the used solution are adsorbed on the resin. The tributyl phosphate used as extractant may be mixed with a diluent, e.g., $C_{10}$—$C_{14}$ n-paraffins. Utilization of a macroreticular resin bed may eliminate the need to wash the tributyl phosphate extractant with large volumes of dilute $Na_2CO_3$ solution and thus avoids generation and disposal of a large volume of radioactive waste.

12 Claims, No Drawings

3,708,508

METHOD FOR THE PURIFICATION AND RECOVERY OF TRIBUTYL PHOSPHATE USED IN REPROCESSING NUCLEAR FUEL

CONTRACTUAL ORIGIN OF THE INVENTION

The invention described herein was made in the course of, or under, a contract with the UNITED STATES ATOMIC ENERGY COMMISSION.

The invention relates to a method for the purification and recovery of tri-n-butyl phosphate used in reprocessing nuclear fuel. The classic Purex process or some modification thereof is now universally used to reprocess all kinds of irradiated nuclear reactor fuel. These processes involve the use of tri-n-butyl phosphate (TBP) extractant. A typical Purex process is described in Reactor Handbook, Vol. II, p. 146, Interscience Publishers, Inc. (1961). All Purex plants routinely perform "solvent-treatment" operations to maintain the quality of the tri-n-butyl phosphate (TBP) extractant. Solvent treatment conventionally involves washing the used extractant with aqueous alkaline potassium permanganate, or acid solutions to remove dibutyl phosphoric acid (HDBP), residual fission products, and, at least partially, diluent degradation products. Chemical and radiolytic degradation of TBP extractants and various solvent treatment procedures are well known in the art.

Sustained, satisfactory operation of various Purex plants in the United States and elsewhere attests to the efficiency of present-day solvent washing techniques. A major disadvantage of these methods, however, is that they generate large volumes of radioactive aqueous waste which must be stored or otherwise treated as high-level waste. At the Hanford plant in Washington, for example, large volumes of solvent wash waste are generated each year. Development of an alternative solvent treatment procedure which does not generate such wastes is both economically and environmentally desirable.

Japanese workers have proposed to eliminate some of the radio-active wastes obtained by previous systems by flowing a solution of tributyl phosphate (TBP) containing acidic chemical and radiolytic degradation products through a bed of microreticular anion exchange resin. Such processes are described in British Pat. No. 1,051,978, published Dec. 21, 1968, and in J. Nucl. Sci. Tech., 4, page 361 (1967).

Applicant has discovered that much more satisfactory results from the point of view of reduction in wastes and removal of chemical and radiolytic degradation products and fission products from used TBP extractant are obtained by passing such extractant through a bed of a macroreticular ion exchange resin. The macroreticular ion exchange resin beds containing the adsorbed impurities can be reused by elution of fission products with $HNO_3$—HF eluant and regenerating the resin with NaOH, but in commercial operation the exhausted used resin beds may be discarded since the resin capacity and resin stability of these macroreticular ion exchange resins are sufficiently great to offset economic penalties involved in resin replacement.

Particularly satisfactory results are obtained with the strong base macroreticular anion exchange resins for adsorbing fission products from unwashed used Purex process solvent. These are much superior to the weak base macroreticular anion exchange resins and to the macroreticular cation exchange resins. The macroreticular cation exchange resins have a greater affinity for $^{95}Zr$—$^{95}Nb$ than the weak base macroreticular anion exchange resin while just the opposite is true for adsorption of radioruthenium. The strong base macroreticular resins are superior for both $^{95}Zr$—$^{95}Nb$, and radioruthenium adsorption to both the weak base and cation exchange macroreticular resins.

The preferred strong base macroreticular anion exchange resins are styrene-divinyl benzene copolymers having quaternary ammonium functional groups. Resins of this type are sold by Rohm & Haas Company under the trademarks Amberlyst A-26 and Amberlyst A-29. These may be prepared by the methods described in British Patents 932,125 and 932,126, for example, Example VI of both patents, and in J. Amer. Chem. Soc., 84, p. 305. The weak base macroreticular anion exchange resins are styrene-divinyl benzene copolymers having amino functional groups. A resin of this type is sold by Rohm & Haas Company under the trademark Amberlyst A-21. These may be prepared by the method described in British Pat. Nos. 932,125 and 932,126, for example Example X of both patents.

The preferred macroreticular cation exchange resin is a styrene-divinyl benzene copolymer having sulfonic acid functional groups. A resin of this type is sold by Rohm & Haas Company under the trademark Amberlyst-15. It may be prepared by conventional sulfonation of the styrene-divinyl benzene copolymer. A method of preparing such highly acidic macroreticular resins is disclosed in British Pat. Nos. 932,125 and 932,126, for example, Example III of both patents.

In the process of this invention the strong base anion exchange resins are preferably converted from the as-received chloride to the hydroxide form by exhaustive washing with 4 M NaOH. The cation resin and the weak base anion resins were used in the as-received $H^+$ and $OH^-$ forms respectively.

Particle size of the resins is not important, suitably being from −8 mesh to +100 mesh (U. S. Standard Screen), 14 to 50 mesh being generally used.

The tributyl phosphate extractant which can be purified by the process of this invention contains chemical and radiolytic degradation products and fission products. The Purex solvent extractant, with which the invention is particularly concerned, comprises tributyl phosphate (TBP), NPH (a mixture of $C_{10}$–$C_{14}$ normal paraffins as a diluent for the tributyl phosphate, from 18–350 $\mu$Ci/liter $^{95}Zr$—$^{95}Nb$ (about 50 percent $^{95}Zr$) and from 75–350 $\mu$Ci/liter $^{106}Ru$—$^{106}Rh$. Small amounts of $^{103}Ru$ and $HNO_3$ (about 0.005 M) are also present, and a minor amount of dibutyl phosphate.

The following examples and procedures are given to illustrate this invention.

In the description below the terms A-26, A-29, A-21 and A-15 refer to macroreticular ion exchange resins of the styrene-divinyl benzene copolymer type which are identical with the resins sold under the trademarks Amberlyst A-26, Amberlyst A-29, Amberlyst A-21 and Amberlyst A-15 respectively.

The term Purex solvent refers to used extracting solution obtained from the reprocessing of nuclear fuel and contains tri-n-butyl phosphate diluted with $C_{10}$–$C_{14}$ normal paraffins, kerosene or other diluents, and also contains fission products, dibutyl phosphate and other chemical and radiolytic degradation products produced during the use of the tributyl phosphate as an extractant in reprocessing nuclear fuel elements. The term 1CW refers to a Purex solution in which the diluent is NPH ($C_{10}$–$C_{14}$ normal paraffins) to give a 30 percent TBP solution, and which also contains fission products, dibutyl phosphate and other chemical and radiolytic degradation products obtained in the reprocessing procedure.

Distribution Ratio Tests

Two-gram portions of screened, air-dried macroreticular ion exchange resin were contacted (30 min, 25°C; mechanical stirring) twice with fresh 10-ml portions of 30 percent TBP-NPH and then (at various times and temperatures) with 10 ml of either used Purex solvent or laboratory-prepared 30 percent TBP-0.054 M HDBP-NPH. (All liquid-solid separations were by centrifugation.) Initial and final liquid phases from the last contact were analyzed either for fission product content (gamma energy pulse height analyses with NaI or Ge(Li) detectors) or for dibutyl phosphate (HDBP) (Beckman Automatic Titrator; derivative mode titration with alcoholic KOH). Distribution ratios ($K_d$) for the loading step were calculated as $$K_d = \frac{\text{amount of material on resin per gram of air-dried resin}}{\text{amount of material in solution per milliliter of solution}}$$

Batch fission product elution tests were performed with 2-gram amounts of 14- to 20-mesh A-29 strong base macroreticular anion exchange resin previously equilibrated twice with 30 percent TBP-NPH and once (30 min at 40°C) with Purex plant used extractant. The resulting resin was washed twice at 40°C with 10-ml portions of NPH and then contacted 15 min at either 25° or 40°C with 10 ml of eluant solution.

Column Runs

Jacketed glass columns (1.88 cm iD) were filled with 25 ml (ca. 17 g) of air-dried 14- to 50-mesh A-26 macroreticular strong base anion exchange resin. After classification by upflow of water, the bed height was about 21 cm corresponding to a bed volume of 58 ml. Successive 4 bed volume portions of 4 M NaOH and laboratory-prepared 30 percent TBP-NPH were passed downflow at 25°C and at a rate of 4 bed volumes/hr. No change in bed volume occurred during these latter treatments.

All column runs with Purex first cycle solution were made with downflow loading at 40°C. Three runs were made at flow rates of 1.1, 4.3, and 8.6 bed volumes/hr, respectively, to determine the effects of flow rate upon fission product retention. In each test 50 to 55 bed volumes of Purex first cycle solution were loaded.

Additional tests were made to establish A-26 resin capacity and behavior during consecutive load and elution cycles. Initially, 245 bed volumes of Purex 1CW solution (taken at various times during plant operation) were loaded onto a fresh resin bed at a rate of 4 bed volumes/hr. Consecutive portions of water, 3 M $HNO_3$–0.05 M HF, and 4 M NaOH (4, 16, and 12 bed volumes, respectively) were used to wash, elute, and regenerate the resin. Elution was done upflow at 25°C and at a rate of 4 bed volumes/hr. Following reclassification of the eluted bed with water, an additional 107 bed volumes of Purex 1CW solution were loaded. Except that it was done at 40°C and at 2 bed volumes/hr, the second elution cycle was identical to the first.

Solvent Quality Tests

Various physical and chemical properties of plant solvent after ion exchange cleanup were measured. Similar measurements were made with washed and unwashed plant solvents. Tri-n-butyl phosphate concentrations were determined by gas-liquid chromatography. The apparatus of Mendel and Moore (USAEC Document HW-27807 (1953)) served to measure disengaging times when a TBP solvent was mixed at 25°C with an equal volume of 1.84 M $UO_2(NO_3)_2$–0.5 M $HNO_3$ solution; uranium extraction distribution ratios ($E_a^o$) were calculated from uranium concentrations of the resulting phases.

Plutonium retention tests involved contacting the TBP phase (5 min, 25°C) with one-fifth volume of 3 M $HNO_3$–0.001 M $Pu(NO_3)_4$ solution; the resulting organic phase was scrubbed three times with fresh double-volume portions of 0.01 M $HNO_3$. The plutonium retention number was calculated by multiplying the molarity of plutonium in the final organic phase by $10^9$.

RESULTS AND DISCUSSION

BATCH TESTS

Loading Tests

The two strong base macroreticular exchangers, A-26 and A-29 resins, exhibit about the same affinity for adsorbing fission products from unwashed Purex process solvent. For this purpose, both A-26 and A-29 resins are superior to either A-21 (weak base exchanger) or Amberlyst-15 (cation exchanger) resins. This same resin ranking order was also observed with resin particles smaller than 14 to 20 mesh. Affinity of the Amberlyst-15 resin for $^{95}Zr$—$^{95}Nb$ was greater than that of A-21 resin, while just the opposite was true for adsorption of radioruthenium.

Of great importance is the discovery that macroreticular anion exchange resins have a strong affinity for both the dibutyl phosphate anion (Table I) and fission product Zr, Nb, and Ru in degraded TBP extractants (Table II). Results listed in Table I were obtained on batch basis with a TBP solution containing a much higher concentration of HDBP than is normally encountered in actual Purex process solvent; even so, excellent removal of HDBP was obtained in a single batch contact. The fission product data listed in Table II were obtained with actual current, unwashed Hanford Purex plant first cycle solvent (1CW solution). The greater affinity of the A-21 anion resin over the cation resin for fission product Zr, Nb, and Ru is evident. Significantly, the final TBP solvent obtained in the experiment with the A-21 resin contained less activity than washed Hanford Purex plant first cycle solvent.

For greatest efficiency and operating convenience, ion exchange resins are typically employed in fixed or moving beds in columns. The capacity of an Amberlyst anion exchange resin is typically about 1.0 to 1.5 milliequivalents/ml; hence, a reasonably sized bed of one of the macroreticular resins, say the Amberlyst A-21 material, should be capable of removing HDBP and fission products from many thousands of gallons of used TBP solvent before exhaustion. (The spent resin bed can either be simply discarded as a solid waste or, very probably, be regenerated with a small volume of aqueous NaOH.) Utilization of a macroreticular resin bed for this purpose would eliminate the need to wash the TBP extractant with large volumes of dilute $Na_2CO_3$ solution and thus would avoid generation and disposal of a large volume of radioactive waste.

TABLE I

ANION EXCHANGE RESIN ADSORPTION OF HDBP FROM TBP EXTRACTANT

Conditions: 5.0 g portions of listed resins contacted (30 min, 25°C) twice with fresh 25 ml portions of 30% TBP-NPH solution and then with 8 ml of a 30% TBP-0.046 M HDBP-NPH solvent.

| Resin Type[a] | HDBP Kd[b] |
|---|---|
| A-21[c] | 11.5 |
| A-26[d] | 6.76 |
| A-29[d] | 5.74 |

(a) All Rohm & Haas Company Amberlyst Resins.
(b) Kd = Concentration of HDBP in resin phase/concentration of HDBP in final solution.
(c) In OH⁻ form as-received.
(d) Converted to OH⁻ form (by washing with alcoholic KOH) prior to contact with 30% TBP-NPH.

TABLE II

MACRORETICULAR RESIN ADSORPTION OF FISSION PRODUCT FROM UNWASHED PUREX PLANT SOLVENT

Conditions: 10 g portions of listed resins contacted (30 min, 25°C) three times with fresh 25 ml portions of 30% TBP-NPH solution and then with 20 ml of Purex plant 1CW solution.[a]

| Resin type [b] | Kd (c) | | | Percent removal | | |
|---|---|---|---|---|---|---|
| | ⁹⁵ZrNb | ¹⁰³Ru | ¹⁰⁶RuRh | ⁹⁵ZrNb | ¹⁰³Ru | ¹⁰⁶RuRh |
| A-21 [d] | 44.0 | 55.6 | 41.9 | 95.4 | 96.4 | 92.0 |
| Amberlyst 15 [e] | 0.43 | 2.93 | 2.71 | 18.2 | 59.7 | 57.8 |

(a) Initial ICW contained 1.3 µCi/l ⁹⁵ZrNb, 13 µCi/l ¹⁰³Ru, and 120 µCi/l ¹⁰⁶RuRh.
(b) All Rohm & Haas Company Amberlyst Resins.
(c) Kd=Concentration activity resin phase/concentration activity in final solution.
(d) In OH⁻ form as-received.
(e) In H⁺ form as-received.

(a) Initial 1CW contained 1.3 µCi/l ⁹⁵ZrNb, 13 µCi/l ¹⁰³Ru, and 120 µCi/l ¹⁰⁶RuRh.
(b) All Rohm & Haas Company Amberlyst Resins.
(c) Kd = Concentration activity resin phase/concentration activity in final solution.
(d) In OH⁻ form as-received.
(e) In H⁺ form as-received.

Kinetics of adsorption of fission products from used Purex extractant by macroreticular ion exchange resins are significantly faster at 40°C than at 25°C and to take advantage of this fact, subsequent column runs were made at 40°C. These column runs were made with A-26 resin since manufacturer's literature indicates thermal stability of A-26 resin is slightly greater than that of the A-29 resin.

Kinetics of fission product uptake by the macroreticular resins also varies with resin particle size. As expected, the smaller particles absorb activity faster than large beads at both 25 and 40°C. At long contact times the particle size effect disappears and the equilibrium distribution for a particular resin is attained. Column runs were made with as-supplied 14 to 50 mesh A-26 resin; classification into smaller particle size fractions is considered impractical for projected plant-scale application.

Characteristics of the strong adsorption of HDBP by strong base macroreticular anion exchange resins were apparent. Kinetic effects operative in this case and their variation with temperature and particle size are similar to those noted for uptake of fission products. Indirect evidence for adsorption of acidic components other than HDBP and fission products from Purex solution was obtained in column runs.

Elution Tests

Various reagents were screened on a batch basis to determine their ability to elute fission product activity from loaded macroreticular resin. Results of some of these tests are listed in Table III.

TABLE III

FISSION PRODUCT ELUTION-BATCH TESTS

Two grams 14—20 mesh A-29 resin containing 12 µCi ⁹⁵Zr—⁹⁵Nb and 1.6 µCi ¹⁰⁶Ru—¹⁰⁶Rh contacted 15 min at 25°C with 10 ml eluant.

| | Percent eluted | |
|---|---|---|
| Eluant Composition | ⁹⁵Zr—⁹⁵Nb | ¹⁰⁶Ru—¹⁰⁶Rh |
| 1 M HNO₃ | 52.9 | 55.9 |
| 3 M HNO₃ | 67.9 | 53.6 |
| 5 M HNO₃ | 60.3 | 55.4 |
| 1 M NaOH | 27.6 | 37.2 |
| 1 M NaHCO₃ | 10.9 | 17.1 |
| 1 M Na₂S₂O₃ | 2.8 | 12.0 |
| 1 M sodium citrate | 14.8 | 22.0 |
| 3 M HNO₃—0.05 M HF[a] | | |
| Contact 1 | 79.7 | 66.2 |
| Contact 2 | 18.3[b] | 10.1[b] |
| Contact 3 | 4.7[b] | 6.0[b] |
| 3 M NaOH[a] | | |
| Contact 1 | 64.3 | 63.4 |
| Contact 2 | 11.1[b] | 14.8[b] |
| Contact 3 | 2.8[b] | 7.9[b] |

(a) Three successive contacts with fresh 10-ml portions eluant.
(b) Percent of total activity on initial 2 g resin.

Nitric acid solutions containing small concentrations of fluoride are highly effective for eluting ⁹⁵Zr—⁹⁵Nb; as shown by the data in Table III, three successive contacts with 3 M HNO₃—0.05 M HF solution eluted all the ⁹⁵Zr—⁹⁵Nb from a batch of resin. (Beneficial effects of fluoride ion in removing ⁹⁵Zr—⁹⁵Nb from anion exchange resins have been noted earlier.) Conversely, no completely satisfactory elutriant for removing ¹⁰⁶Ru—¹⁰⁶Rh activity from the loaded macroreticular resin has yet been found. Of the reagents tested for this purpose, NaOH and HNO₃-HF solutions appear best and were used in column tests.

Column Tests

Column tests with A-26 macroreticular strong base anion resin extended the new solvent treatment scheme to a dynamic system; data obtained in these runs generally substantiated effects noted in the batch work.

Flow Rate Effects

Illustrative of the kinetic aspects of the new solvent treatment process is the way fission product absorption increases with decreasing feed flow rate. For the conditions used, over 97 per cent of both $^{106}$Ru—$^{106}$Rh and $^{95}$Zr—$^{95}$Nb were retained by the resin bed at a flow rate as high as 4 bed volumes/hr. At all flow rates, column effluent fission product concentrations remained essentially constant over the entire 50 to 55 column volumes, thus evidencing the great capacity of the A-26 resin.

Cyclic Load-Elution Tests

Spectacular confirmation of the ability of the A-26 macroreticular resin to clean up large quantities of used Purex solvent was provided by cyclic load and elution tests. Through the first loading cycle (245 column volumes), the effluent fission product content remained at a very low level with no indication that breakthrough was approaching. The first loading cycle was terminated and the bed eluted at this point only because Purex solvent feedstock was temporarily unavailable. Effluent product obtained in a second loading cycle (107 bed volumes) was comparable in all respects to that produced in the first cycle and again there was no evidence for any breakthrough.

Throughout both loading cycles, the fission product content of the organic effluent remained approximately constant. As a consequence, the fraction ($C/C_o$) of each fission product reporting to the effluent stream varied with its concentration in the influent Purex feed. This effect was very evident in the $^{95}$Zr—$^{95}$Nb results; and, to a lesser extent, also in the $^{106}$Ru—$^{106}$Rh data. Such behavior emphasizes the kinetic aspects of the absorption process; operation at a flow rate lower than 4 bed volumes/hr would have reduced $C/C_o$ values correspondingly.

A significant feature of the column tests was the removal of the yellow color from the degraded feed solvent. All the effluent including that obtained after the first elution cycle was water-white just like virgin solvent. During both loading cycles, a yellow color-front slowly moved down the resin bed. The identity of the yellow material has not yet been established, but it presumably represents the small amount of nitrated diluent present in the Purex solvent. The first portions of 4 M NaOH eluant appeared to remove all the yellow color from the bed in both elution cycles.

Essentially all the $^{95}$Zr—$^{95}$Nb but only about 64 per cent of the $^{106}$Ru—$^{106}$Rh present on the loaded resin bed were removed in the first elution cycle. The second elution cycle made at 40°C was not as effective as the first (made at 25°C) in that only 71 per cent of the $^{95}$Zr—$^{95}$Nb and 55 percent of the $^{106}$Ru—$^{106}$Rh activity on the bed were eluted. (The latter percentage takes into account $^{106}$Ru—$^{106}$Rh left on the bed after the first elution cycle.) Of the $^{95}$Zr—$^{95}$Nb and $^{106}$Ru—$^{106}$Rh eluted in each cycle, 97 percent and 80 per cent, respectively, were removed by the HNO$_3$-HF eluant. Poorer $^{95}$Zr—$^{95}$Nb elution observed in the second elution cycle agrees with temperature effects noted in batch work (Table III).

The elution cycle results point up the relative ineffectiveness of HNO$_3$-HF and NaOH solutions for removing radioruthenium from loaded macroreticular anion exchange resin. In plant applications, however, exhausted beds might be simply discarded as solid waste without any need for regeneration. This favorable position could exist if both resin capacity and resin stability were sufficiently great to offset economic penalties involved in resin replacement.

Solvent Quality

New procedures proposed for cleaning up Purex process solvent must do at least as good a job as the aqueous wash schemes presently in use — and preferably better. Against this standard, the merits of the macroreticular ion exchange treatment stand out clearly (Table IV). Particularly noticeable are the low fission product content and plutonium retention number of the resin-treated extractant; both values are substantially lower than those for alkaline permanganate-washed plant solvent. The plutonium retention number like the analogous "Z" and "H" numbers has traditionally been considered a sensitive measure of the presence of deleterious diluent and/or TBP degradation products in used Purex process solvent. The colorless appearance of the resin-treated TBP extractant and its very low plutonium retention number are convincing evidence that the ion exchange procedure effectively removes these degradation products. It is truly a "-solvent cleanup" method and not just a mechanism for removing radioactivity.

The other properties listed in Table IV (TBP concentration, density, etc.) all confirm that ion exchange treatment neither removes nor adds components to the Purex solvent which affect its hydraulic and chemical performance as an extractant for uranium and plutonium. (Variation of a factor of two in disengaging time with the apparatus used is not regarded as significant.)

TABLE IV.—PROPERTIES OF MACRORETICULAR ION EXCHANGE-TREATED PUREX SOLVENT

| Test/property | Purex plant 1CW * | Purex plant 100 ** | Ion exchange-treated bed volumes | | Lab-prepared solvent † |
| --- | --- | --- | --- | --- | --- |
| | | | 119 | 195 | |
| TBP, vol. percent | 29.6 | 29.2 | 28.8 | 29.9 | 30.0 |
| Color | Yellow | Yellow | Colorless | Colorless | Colorless |
| Density, g./ml | 0.8111 | 0.8122 | 0.8108 | 0.8114 | 0.8126 |
| Fission product content, Ci/liter: | | | | | |
| $^{95}$Zr | 90. | 3.4 | 0.62 | 0.35 | |
| $^{95}$Nb | 98. | 2.1 | 0.69 | 0.54 | |
| $^{106}$Ru | 170. | 9. | 1.2 | 3.0 | |
| Disengaging time, sec | 37 | 61 | 28 | 50 | 67 |
| U Extraction, $E_a$ | 0.318 | 0.236 | 0.381 | 0.334 | 0.387 |
| Pu retention number | 2070. | 50. | 6. | 9. | 23. |

\* Typical Purex plant material.
\*\* Hanford Purex plant first cycle used solvent after washing with aqueous Na$_2$CO$_3$-KMnO$_4$ and HNO$_3$ solutions.
† TBP diluted with NPH (C$_{10}$-C$_{14}$ normal paraffins) and containing dibutyl phosphate (HDBP) of concentration of .054 M.

CONCLUSIONS

Application of macroreticular ion exchange resins to cleanup of used Purex process solvent containing fission products, dibutyl phosphate and other chemical and radiolytic degradation products present in such solutions has been successfully demonstrated. A primary advantage of the macroreticular ion exchange method is that it eliminates the large volumes of radioactive waste generated by present-day aqueous wash schemes. Also, quality of the product obtained by the macroreticular ion exchange procedure is equal or superior to that of solvent washed with conventional alkaline permanganate solutions and is superior to that obtained with microreticular ion exchange resins.

The new macroreticular resins are suitable for use in non-aqueous and even non-polar media. Both anion and cation exchange type resins are available. The pores of the macroreticular resins are considerably larger than those found in conventional ion exchange resins, and they do not disappear when the swelling solvent, water, is removed. The macroreticular structure therefore permits non-polar solutions to diffuse freely throughout the resin, making the functional groups available for their ion exchange activity.

Application of conventional (i.e., non-macroreticular) ion exchange resins for purification of TBP extractants has been patented previously by Japanese workers (British Pat. No. 1,051,978, Dec. 21, 1968). Experience has shown, however, that conventional ion exchange resins are inadequate for most non-aqueous applications because of the unfavorable kinetics and physical breakdown involved. The relative lack of porosity of conventional resins in non-swelling media causes molecules to diffuse very slowly through the resin gel. Conversely, macroreticular resins, due to their increased fixed porosities and greater pore diameters, are far superior in non-swelling solvents. Also, since macroreticular resins possess a much greater surface area and consequently a larger number of readily accessible functional sites per unit weight, much greater loading and elution rates are realized in their use than is usually found in the case of conventional resins.

Another drawback in the use of conventional resins for ion exchange in non-polar media lies in the excessive degree of swelling that they undergo during regeneration cycles in which polar solvents or solutions are employed. The structural stresses due to this excessive swelling and contraction of the beads cause conventional resins to rupture drastically in the process. Since macroreticular resins are most resistant to osmotic shock, they are resistant to attrition brought about by alternate contacts with solvents of different polarities.

With macroreticular resins, plant-scale ion exchange treatment of degraded TBP extractants becomes practical.

The following are results of later tests:

A test was made to determine capacity of a 20-ml (0.95 cm$^2$ area) bed of Amberlyst A-26 resin for removal of fission products and other contaminants from 1CW Purex solution. By the end of the test 1,465 column volumes of 1CW solution had been passed downflow (at 40°C and at about 4 bed volumes/hr) through the 14–50 mesh resin bed with no indication of any kind of breakthrough. Throughout all the loading cycle, the resin removed over 99 percent of all the fission product activity from the influent 1CW. Throughout the loading cycle also plutonium retention by the effluent solvent remained at a very low level. Data for the last 621 column volumes are listed in Tables V and VI.

TABLE V

PROPERTIES of 1CW FEEDS

| Feed No. | Fission Products, μCi/liter | | | Plutonium No. |
|---|---|---|---|---|
| | $^{95}$Zr—$^{95}$Nb | $^{106}$Ru—$^{108}$Rh | $^{103}$Ru | |
| 8 | 0.16 | 223. | 6.06 | 10,920 |
| 9 | – | – | – | – |
| 10 | – | 128. | 1.14 | 9,300 |
| 11 | 0.0493 | 122. | 2.23 | 8,250 |
| 12 | – | 174. | 6.50 | 10,760 |
| 13 | 0.0878 | 196. | 3.10 | 8,400 |

TABLE VI

EFFLUENT PROPERTIES

| Effluent Composite Column Volumes | Fission Product, μCi/liter | | | Pu No. |
|---|---|---|---|---|
| | $^{95}$Zr—$^{95}$NB | $^{103}$Ru | $^{106}$Ru-$^{106}$Rh | |
| 842-960 | – | – | 1.67 | 118 |
| 961-1036 | – | – | 1.87 | 47 |
| 1037-1160 | – | – | 1.63 | – |
| 1161-1274 | – | – | 1.90 | 41 |
| 1275-1365 | – | 0.0406 | 2.27 | 47 |
| 1366-1465 | – | 0.0350 | 2.47 | 37 |

At the end of the loading cycle the over-all column height was 18.5 cm (down about 1.5 cm from the start of the run). The top 5 cm of the column was white and was intensely radioactive (1 rad at surface); indeed, essentially all the radioruthenium was present here in this short, sharp band. The white band was followed by a 4-cm long yellow band and then a 9.5-cm long tan band at the bottom of the column.

Elution Cycle

Table VII shows the elution sequence employed to regenerate the loaded column.

Actually, elution proceeded very beautifully. The first 1.7 column volumes of water removed the bulk of the organic solvent left in the bed after the load step. What appeared to be the original color of the resin was regenerated as soon as the first portions of 3 M $HNO_3$—0.05 M HF eluant entered the bottom of the resin bed. Eventually, a yellow-colored effluent came off and when finished with the $NHO_3$ eluant even the top of the resin looked like unused resin. The water wash following the $HNO_3$ elution step served to displace the last amounts of yellow liquor from the bed and to reclassify the resin. The elution sequence was completed by downflow of about 6 column volumes of 4 M NaOH. This eluant served to remove additional radioruthenium (see Table VII) and also converted the resin from the pale beige of nitrate-form resin to the darker brown of the OH$^-$ form. The final two water washes were performed primarily to remove the 4 M NaOH from the bed.

The entire eluted resin bed was brownish in color but of a slightly deeper brown color than virgin OH⁻-form resin. The white color at the top of the bed was gone; the resin at this point was just slightly lighter brown than the material at the bottom of the bed. The whole eluted resin bed had a uniform exposure rate (at surface) of about 10 to 15 mrad/hr. Also because of a couple of air pockets the resin bed height was 22 cm versus the 20 cm height for the initial, unloaded bed.

Throughout the elution cycle it was impressive that the resin particles were present as discrete beads with physical properties apparently comparable to unused beads.

TABLE VII.—ELUTION SEQUENCE

| Eluant No. | Eluant composition | Vol., ml. | Bed, bed, vols. | Flow rate vols./hr. | Effluent composition, µCi/liter $^{103}$Ru | Effluent composition, µCi/liter $^{106}$Ru–$^{106}$Rh | Total $^{106}$Ru–$^{106}$Rh eluted µCi | Total $^{106}$Ru–$^{106}$Rh eluted Percent |
|---|---|---|---|---|---|---|---|---|
| 1ª | H₂O | 34 | 1.7 | 1.7 | 8.1 | 614 | 20.9 | 0.73 |
| 2ª | 3 M HNO₃–0.05 M HF | 34 | 1.7 | 1.7 | 588. | 4,310 | 146.5 | 5.10 |
| 3ª | 3 M HNO₃–0.05 M HF | 48 | 2.4 | 2.4 | 384. | 25,500 | 1,224.0 | 42.60 |
| 4ª | 3 M HNO₃–0.05 M HF | 50 | 2.5 | 2.5 | 91.3 | 7,800 | 391.0 | 13.61 |
| 5ª | H₂O | 54 | 2.7 | 2.7 | 74.3 | 4,670 | 252.2 | 8.78 |
| 6ᵇ | 4 M NaOH | 38 | 1.9 | 1.9 | 241. | 16,400 | 623.2 | 21.69 |
| 7ᵇ | 4 M NaOH | 38 | 1.9 | 1.9 | 37.1 | 3,220 | 122.4 | 4.26 |
| 8ᵇ | 4 M NaOH | 40 | 2.0 | 2.0 | 18.4 | 1,350 | 54.0 | 1.88 |
| 9ᵇ | H₂O | 31 | 1.55 | 1.55 | 24.2 | 1,209 | 37.5 | 1.31 |
| 10ᵇ | H₂O | 32 | 1.6 | 1.6 | 1.07 | 48.9 | 1.6 | 0.06 |
| Total ᶜ | | | | | | | 2,873.3 | |

ª Upflow at 25° C.
ᵇ Downflow at 25° C.
ᶜ Equals 65 percent of $^{106}$Ru–$^{106}$Rh loaded on bed.

As noted in Table VII, the combination of 3 M HNO₃–0.05 M HF (6.6 column volumes) and 4 M NaOH (6 column volumes) removed 65 per cent of the $^{106}$Ru—$^{106}$Rh calculated to be present on the loaded bed. Removal of only this much ruthenium is in excellent agreement with results of previous batch work. ALso, and very significantly, the 65 percent value obtained in the present work compares very favorably to the 64 percent ruthenium elution obtained in the work reported in ARH-SA-52. In this latter work, however, 15 and 12 bed volumes, respectively, of 3 M HNO₃–0.0 5 M HF and 4 M NaOH solution were used to elute the loaded bed. There is an obvious advantage in reducing the volume of the elution solutions which must be stored or otherwise treated.

A generic description of the preferred cross-linked macroreticulated ion exchange resins used in this invention is given in claim 3 of British Pat. No. 932,125 as supported by the disclosure in British Pat. No. 932,125. As set forth in this claim and the disclosure in the patent, the resin is a polymerized mass composed of a cross-linked copolymer of (1) polyunsaturated monomer containing a plurality of

groups in nonconjugated relationship and (2) monoethylenically unsaturated monomer, wherein said polymerized mass is constituted by an aggregation of micro beads which is resistant to physical stress, the aggregation of micro beads being visible in an electron photomicrograph and defining a retention of microscopic channels extending through the mass, said mass having ion exchange groups thereon. The strong base anion exchange resin of this invention is a quaternary anion exchange made by using trialkylamine as the aminating agent. Both weak base (amino groups and not quaternary group) and strong base type and methods of making them are disclosed in British Pat. Nos. 932,125 and 932,126 as are the cation exchange types containing either sulfonic acid or carboxylic acid groups. British Pat. Nos. 932,125 and 932,126 are hereby incorporated in this application by reference.

The embodiments of the invention in which an exclusive property or privilege is claimed are defined as follows:

1. A method for removing chemical and radiolytic degradation products and fission products from a solvent comprising tributyl phosphate which comprises contacting the solvent containing said degradation and fission products with a macroreticular ion exchange resin thereby adsorbing said degradation and fission products.

2. A method in accordance with the method of claim 1 in which the macroreticular ion exchange resin is an anion exchange resin.

3. A method according to claim 2 in which the anion exchange resin is strong base anion exchange resin comprising a styrene-divinyl benzene copolymer which has attached to it quaternary ammonium groups.

4. A method in accordance with claim 2 in which the anion exchange resin is a weak base anion exchange resin comprising a styrene-divinyl benzene copolymer having an amine group attached thereto.

5. A method in accordance with claim 1 in which the ion exchange resin is a cation exchange resin.

6. A method in accordance with claim 5 in which the cation exchange resin is a styrene-divinyl benzene copolymer having sulfonic acid group attached thereto.

7. A method in accordance with claim 3 in which the solvent contains dibutyl phosphate and zirconium, niobium and ruthenium fission products.

8. A method according to claim 1 wherein the solvent comprises tributyl phosphate diluted with $C_{10}$–$C_{14}$ normal paraffins, and contains as impurities dibutyl phosphate and zirconium, niobium and ruthenium fission products.

9. The method according to claim 7 wherein the resin containing the adsorbed impurities is eluted with aqueous nitric acid solution containing fluoride ion.

10. The method according to claim 8 wherein the resin is a cation exchange resin.

11. The method according to claim 1 wherein the resin is a polymerized mass composed of a cross-linked copolymer of (1) polyunsaturated monomer containing a plurality of

groups in nonconjugated relationship and (2) monoethylenically unsaturated monomer, wherein said polymerized mass is constituted by an aggregation of micro beads which is resistant to physical stress, the aggregation of micro beads being visible in an electron photomicrograph and defining a retention of microscopic channels extending through the mass, said mass having ion exchange groups thereon, and the said solvent comprising tributyl phosphate is flowed through the resin mass to remove impurities, and the tributyl phosphate after contact with the resin mass is collected.

12. The method according to claim 11 wherein the ion exchange groups are quaternary ammonium groups to give strong base ion exchange properties.

* * * * *